United States Patent [19]

Heaman et al.

[11] 4,031,369

[45] June 21, 1977

[54] INTERPOLATION AND CONTROL APPARATUS AND METHOD FOR A NUMERICAL CONTROL SYSTEM

[75] Inventors: James Patrick Heaman, Westland, Mich.; James Anthony Michaud, Bellbrook, Ohio

[73] Assignee: The Bendix Corporation, Southfield, Mich.

[22] Filed: Aug. 12, 1975

[21] Appl. No.: 603,986

[52] U.S. Cl. .......................... 235/151.11; 235/152; 318/573

[51] Int. Cl.² .................. G05B 19/30; G06F 15/46

[58] Field of Search .................. 235/151.11, 152; 318/573; 340/172.5

[56] References Cited

UNITED STATES PATENTS

| | | | |
|---|---|---|---|
| 3,634,661 | 1/1972 | Fitzner | 235/151.11 |
| 3,720,814 | 3/1973 | Klein | 235/151.11 |
| 3,728,528 | 4/1973 | Walters | 235/151.11 X |
| 3,740,535 | 6/1973 | Szabo | 235/151.11 |
| 3,864,613 | 2/1975 | Cutler | 318/573 |
| 3,882,304 | 5/1975 | Walters | 235/151.11 |
| 3,916,175 | 10/1975 | Lauer et al. | 235/151.11 X |

Primary Examiner—Joseph F. Ruggiero
Attorney, Agent, or Firm—James R. Ignatowski

[57] ABSTRACT

A numerical control system having both linear and circular interpolating capabilities is described. Data from a permanent storage medium such as tape are input to a preprocessor. The preprocesor processes the data into a form acceptable to the system logic and makes all parameters for both linear and circular interpolation available to the system logic. Because linear interpolation is used, straight lines as well as arbitrary curves which are simulated by a series of short straight line segments can be drawn or cut. Additionally, because circular interpolation is used, arbitrary curves can be simulated by a series of arcs, each of the arcs being a portion of a different circle and the various circles having varying radii in accordance with the dictates of the arbitrary curve being cut or drawn. The ability to use both circular and linear interpolation substantially reduces the data processing because the interpolation technique requiring the least definition can be conveniently employed. Also, because of the particular interpolation techniques employed, a minimum of multiplication and division is required so that the system logic is substantially reduced. Additionally, because of the particular linear and circular interpolation techniques and because of the data processing technique employed, the execution time of real time tasks is reduced. This results in a substantial reduction in demands on the computing capabilities of the system, thereby significantly increasing the overall capabilities of the system.

7 Claims, 10 Drawing Figures

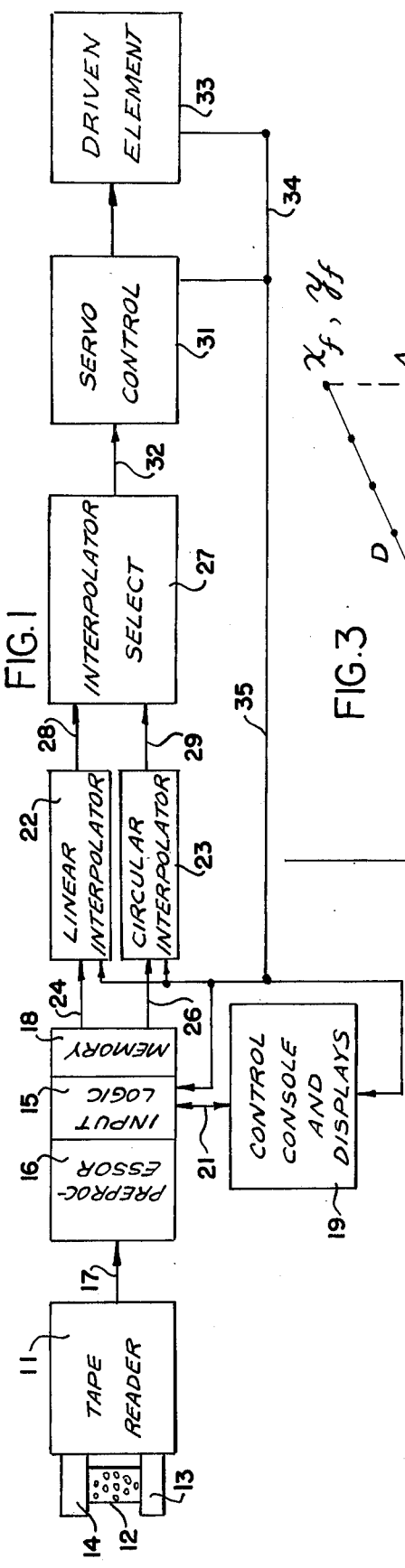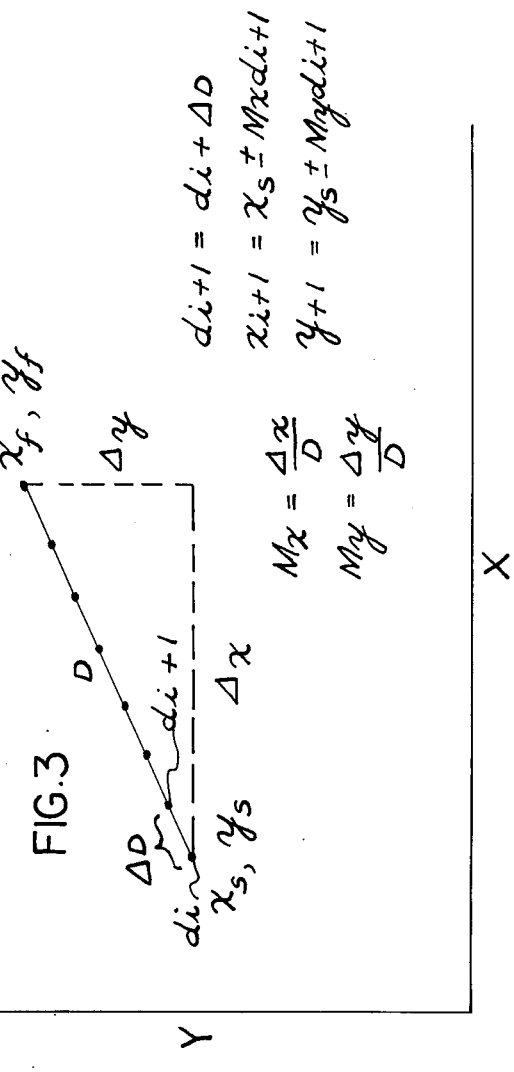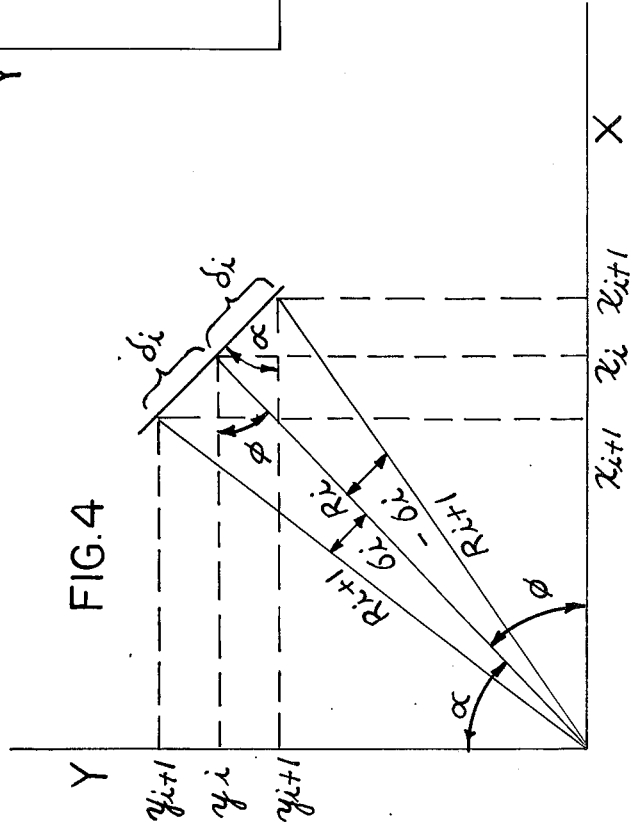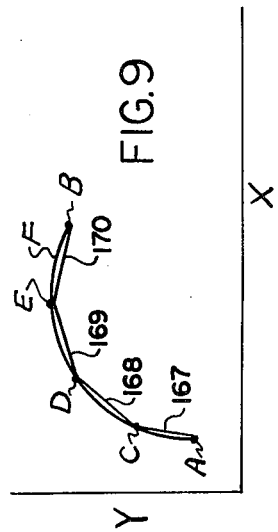

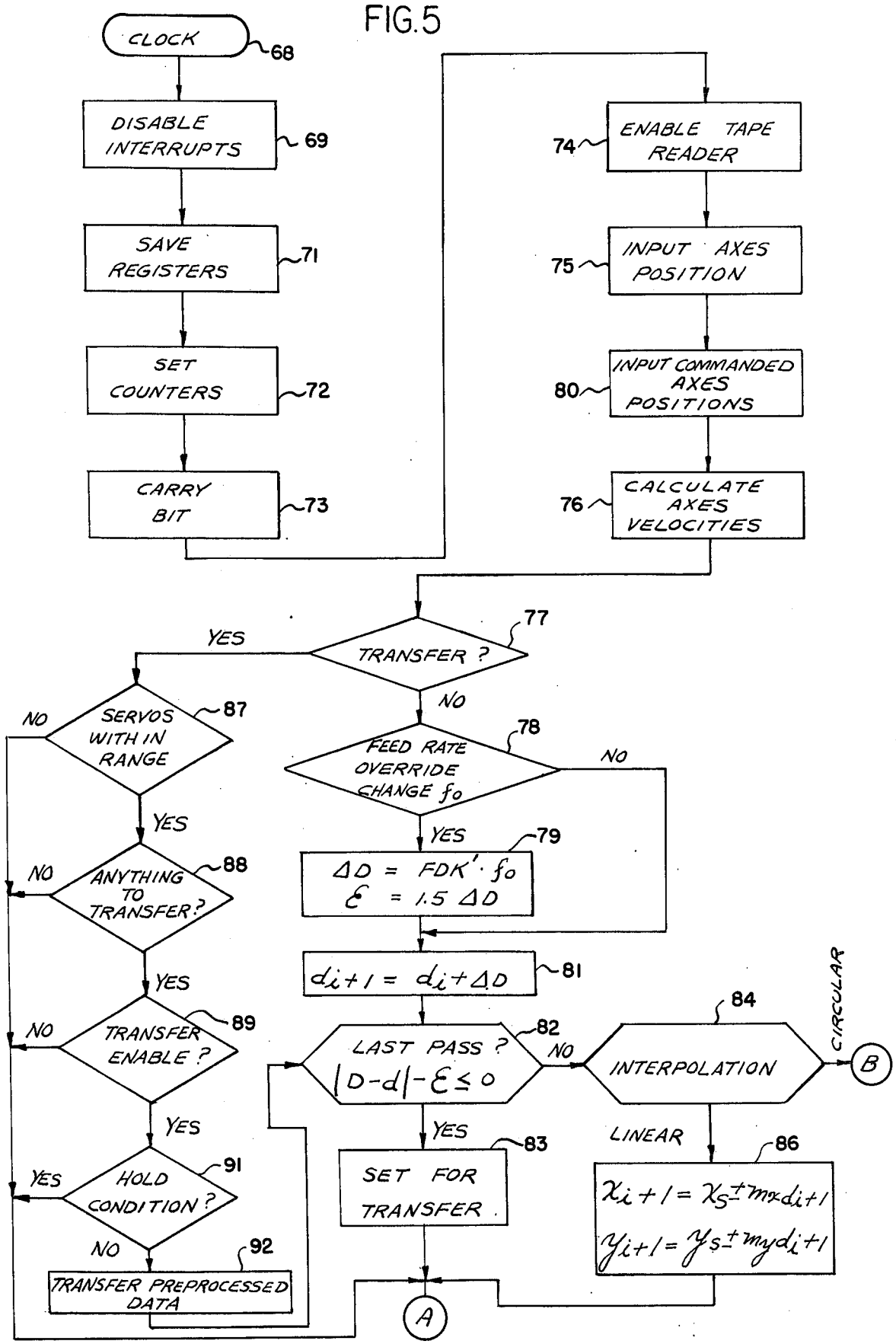

INTERPOLATION AND CONTROL APPARATUS AND METHOD FOR A NUMERICAL CONTROL SYSTEM

BACKGROUND OF THE INVENTION

The invention falls into that area of the art most commonly known as numerical control (N/C). The general category N/C encompasses three areas of art most frequently referred to as N/C machine tool controls, N/C plotters, and N/C displays. Numerical control equipment is used in the machine tool industry to fabricate two or three dimensional parts having arbitrary configurations. This is accomplished by driving servos or pulse motors along mutually perpendicular axes in a synchronized fashion so that any arbitrary curve or straight line can be cut irrespective of the line orientation with respect to the axes. Three dimensional parts can be made by driving three motors along three mutually perpendicular axes. Also, the rotation of the part can be controlled and defined as the fourth controlled axes. Thus four, and if required by the dictates of the N/C system, more than four axes of motion can be synchronously controlled.

Graphic plotting N/C equipment is ordinarily used to automatically draw designs of arbitrary configuration on paper or other media. Typically, graphics equipment is two-dimensional so that a pen or scrib is driven along a path which is predefined with respect to X and Y axes. Also, in some instances, a third axis is defined so that graphic representations can be made on non-planar surfaces. The third axis in some instances is used to raise and lower the pen. Both machine tool and graphic equipment operates by applying pulses to the coils of either pulse motors or analog servo motors after converting the digital signals to analog voltages. Numerical control display equipment ordinarily employs a cathode ray tube (CRT) in which the electron beam is deflected to create designs having arbitrary configurations on the face of the CRT. Accordingly, CRT equipment is very similar to graphics equipment; however, the digital signals from the system logic which are converted into analog voltages are applied to the deflection coils of the CRT. Frequently CRT equipment is used to verify the accuracy of part programs for machine tool or graphics equipment so that errors in the part program are detected in advance of fabricating a part to allow corrections and thus avoid the damage or destruction to the machine tool equipment or an expensive part that could occur in an effort to fabricate a part with an erroneous program.

Because N/C equipment is required to move the controlled element along straight lines which lie at arbitrary angles with respect to the coordinate axes, it is necessary for the motions along the controlled axes to be synchronized so that the controlled element accurately moves along the desired path. As an example, if the path to be followed is a straight line lying at an angle such that the X distance is twice the Y distance, the controlled element velocity along the X axis most be twice the velocity along the Y axis. Curved lines can be simulated by a series of short straight line segments and the inertia of the system will cause the part to move along a very close approximation of the curve. Alternatively, curves can be drawn by fragmenting the desired curve into a series of arcs, the arcs being portions of different circles having differently located centers and different radii. Irrespective of which of these techniques is utilized it is essential that the data supplied to the individual axes be interpolated so that the motion and velocity relationships required to follow the desired line or curve are input to the controlled element.

Typically in N/C systems the controlled element path is coded onto a storage medium, such as a tape, in segment, or block form so that each segment represents a small fraction of the total path to be traveled. Each segment of the stored information is individually input to the system and the required processing effected. The processed data are then stored in registers and are available for call up from the registers for interpolation and control of the servos which ultimately move the driven element. Accordingly, while the processed data are stored and being executed the system input circuitry and processing logic can receive the next segment of data from the storage medium and process with the data processing. In this manner the subsequent segment of data is available for execution as soon as the prior segment is completely executed and the N/C system is capable of continuous operation. Because these operations require a finite time and because the computation capabilities are limited within the system, the minimization of the real time execution of the various real time system functions would result in a substantial increase of overall system capabilities. This advantage has been recognized by the industry and various efforts to decrease the real time requirements of N/C systems have been tried. One such effort includes utilizing both linear and circular or parabolic interpolation in a given N/C system. Thus, if the required path can be effected utilizing either linear or circular interpolation the interpolation technique requiring the least data processing is utilized for each particular path segment. Such systems enjoyed some success in decreasing the real time requirements of the system. However, the success was limited because they overlook the advantages which can be obtained by optimizing the actual data interpolation and system updating in accordance with the inherent limitations and capabilities of the system.

SUMMARY OF THE INVENTION

The invention is directed to a numerical control system which minimizes the real time required for execution of the various functions to thereby increase the number of real time functions which can be effected by the system. The minimization of real time execution is effected in several ways. Firstly, the system utilizes selective linear or circular interpolation so that the interpolation technique which requires the least amount of data processing is selected. Additionally, the linear interpolation technique employed permits the utilization of the maximum rate within the system capabilities while minimizing the requirement for updating the feed rate while simultaneously maintaining a highly accurate system. In an N/C system any adjustment to the path of the controlled element that occurs at a rate greater than five to seven times the band width of the servo velocity loop is lost because of the inability of the servo system to respond to the changes. Accordingly, by decreasing the trajectory updating in accordance with the response capability of the servo system the data processing is substantially reduced. Therefore, in the invention the trajectory, or controlled element path, is interpolated at the same rate that the servo loop is updated.

System accuracy in the linear interpolation mode is maintained by utilizing an interpolation technique which avoids the cumulation of errors along the desired path while simultaneously permitting feed rate override and cutting speed control during the interpolation. This is accomplished by defining the start and end points of each straight line segment in absolute terms, and by dividing each straight line segment into a series of sample increments which are defined in accordance with the slope of the straight line segment and the total distance traveled along the straight line segment. By utilizing this approach after a predetermined number of sample increments the end point of the segment can be forced so that all interpolation is guaranteed to terminate at precisely the desired end point. Additionally, the feed rate can be changed during the interpolation because the parameters defining the element path are independent of the feed rate calculation and only the velocity of the controlled element is changed in accordance with the feed rate without requiring new computation of the controlled element path.

Real time calculation in the circular interpolation mode is substantially decreased by minimizing the number of multiplication and division functions which are required to interpolate the data. This is accomplished by using a cordic technique for implementing the changes in the trigonometry of the coordinate system occasioned by angular changes along the curved path the controlled element must follow. Thus, by rotating an arbitrary vector either clockwise or counter-clockwise through any one of a set of small angles, the changes in the X and Y coordinates are dependent upon a simple algebraic addition and a single multiplication thereby substantially reducing the real time computation required for the circular interpolation.

BRIEF DESCRIPTION OF THE DRAWINGS

FIG. 1 is a preferred embodiment of the inventive numerical control system utilizing both linear and circular interpolation.

FIG. 3 shows the generation of the data utilized for linear interpolation.

FIG. 4 shows the generation of the data utilized for circuit interpolation.

FIG. 5 shows the control logic for inputting data to the system and the selection of linear or circular interpolation.

FIG. 9 shows how curves can be simulated by a series of short straight line segments.

GLOSSARY OF TERMS

Figure 2:
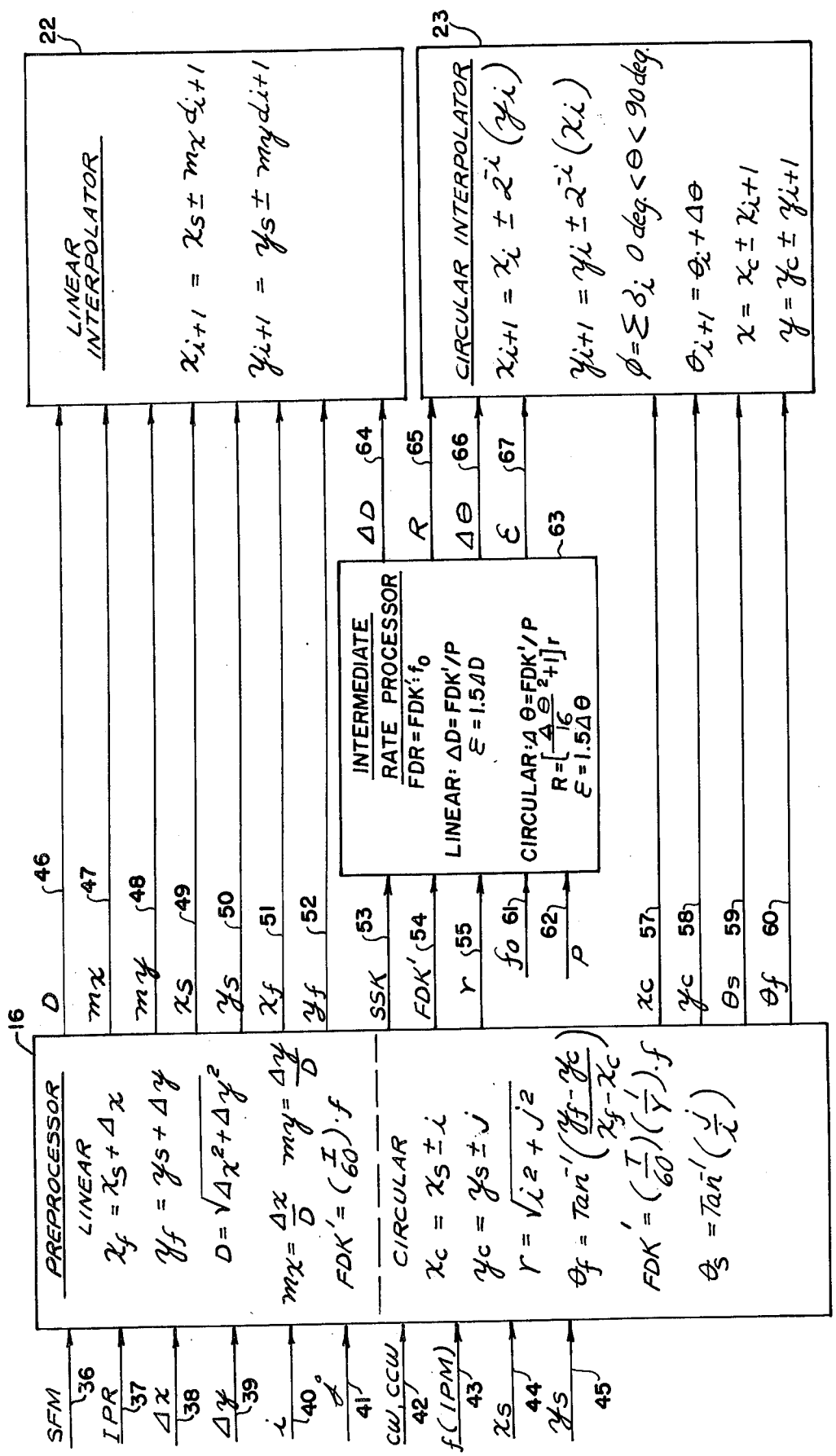
FIG. 2 shows the input data to the system and the preprocessed data parameters which are input to the linear and circular interpolators of the inventive system.

Throughout the description and drawings the following terms and definitions are applicable.

| | |
|---|---|
| $\Delta x$ | x axis departure |
| $\Delta y$ | y axis departure |
| Xs | X start point for a given motion block |
| Ys | Y start point for a given motion block |
| Xf | X end point for a given motion block |
| Yf | Y end point for a given motion block |
| X | X command position |
| Y | Y command position |
| Xc | Circular arc X center coordinate |
| Yc | Circular arc Y center coordinate |
| i | /Xs-Xc/ for a circular motion block |
| j | /Ys-Yc/ for a circular motion block |
| D | Total motion excursion = $\sqrt{(\Delta x)^2 + (\Delta y)^2}$ (linear) |
| $\Delta D$ | Distance traversed in one sample interval (linear) |
| $\Theta$ | Total angular excursion during circular interpolation |
| $\Delta \Theta$ | Angle traversed in one sample interval (circular) |
| $\Theta s$ | Starting angle of circular interpolation |
| $\Theta f$ | Final angle of circular interpolation |
| r | Actual radius of circular arc = $i^2 + j^2$ |
| R | Adjusted radius of circular arc |
| f | Feedrate |
| fo | Feedrate override multiplier |
| $\rho$ | Distance from turning axis of a work piece to tool center |
| Mx | Proportioning constant = $\Delta x/D$ |
| My | Proportioning constant = $\Delta y/D$ |
| N | Number of sample intervals per motion block |
| T | Sampling interval in seconds i.e. the real time required to travel the segment D |
| $\epsilon$ | Radius of motion termination zone |
| FDK' | Feedrate intermediate constant divided by Feedrate override multiplier |
| FDK | Feedrate intermediate constant |
| d | Distance traversed within linear motion interpolation |
| CW,CCW | Arc direction - clockwise, counterclockwise |
| E | Chord error |
| IPR | Inches per revolution (feedrate) |
| SFM | Surface feed/minute (spindle speed) |
| IPM | Inches per minute (feedrate) |
| SFK | Intermediate SFM feedrate constant |
| SSK | Intermediate spindle speed constant |
| SSN | Spindle speed number |

DETAILED DESCRIPTION

FIG. 1 is useful in understanding numerical control equipment in general and the invention in particular. Before proceeding it should be appreciated that the numerical control system as illustrated in FIG. 1 can be reduced to practice using either hardware or software. Thus, if desired, each of the operational blocks shown in FIG. 1 can be built utilizing desired circuit or read only memory (ROM) circuits. In such a system the data processing capabilities of each operational block is permanently programmed so that the total capabilities of the system are fixed and unchangeable. Nevertheless, a wide variety of parts can be fabricated on a hardware system simply by changing the values of the input parameters to the system. However, the ability to add optional features, such as cutter tool compensation, is restricted because of the permanent nature of a hardware system. Alternatively, if flexibility is desired so that a variety of optional features can be easily added, the system can be reduced to practice utilizing software, that is an erasable memory computer. With either a software or a hardware system each time a different part is to be fabricated a new program is introduced into the system logic so that the values for the various parameters are changed and different controlled element paths can be followed. After the system is conditioned to trace a particular path any number of executions of that path can be traced simply by maintaining the parameter values for that path in the memory of the system. When a different part is to be fabricated, or a new path is to be followed, the old parameter values are removed from the memory and the new parameter values introduced therein. It should also be understood that if desired a hybrid system can be made so that some portions of the system are reduced to practice utilizing software while others are reduced to practice utilizing hardware. Thus, for example, if desired, the interpolators can be hardwired because the particular interpolation techniques will not change despite changes in the configurations of the paths to be followed by the controlled element. Because path configuration changes and the addition of optional features result in changes in the parameters input to the system the preprocesser and memory preferably are software when maximum flexibility for the system is desired. Accordingly, although the best mode presently contemplated and described herein is directed to a software type reduction to practice it should be understood that hardware reductions to practice are also contemplated and are encompassed by the invention.

As shown in FIG. 1 the system includes a Tape Reader 11 which is utilized to input data to the system from a perforated Tape 12 as the tape is transferred from a Storage Reel 13 to a Take-up Reel 14 in known manner. The Tape 12 carries a series of holes or magnetic indications which represent in binary fashion the path the controlled element must follow. The data encoded, onto Tape 12 include the coordinate positions along the path to be followed, the type of interpolation to be used in following the intended path, and the other parameters which are essential to the proper manipulation and interpolation of the control data. The data from Tape Reader 12 are input to Preprocesser 16 over Cabling 17. Preprocesser 16 processes the input data and makes the data meaningful to and useful by the system control logic. The preprocessed data are input to the system through Input Logic 15 and are stored in Memory 18 so that the Preprocesser 16 is available to receive fresh input data from Tape Reader 11 while the previously input data are being executed through the interpolators and utilized to drive the controlled element along one segment of the desired path.

The system also includes a Control Console 19. Bilateral communication between Preprocesser 16 and Control Console 19 are affected through the Cabling 21. Thus, data can be input to the console to actuate displays and provide other information necessary to the operator of the system. The operator can manually input control data, such as feed rates changes to the system by the use of control knobs and potentiometers provided on the console, in known manner.

Preprocessed data for linear interpolation are injected from Memory 18 to Linear 22 over Cabling 24 while preprocessed data for circular interpolation are provided to Circular Interpolator 23 over Cabling 26. The interpolated data from Interpolators 22 and 23 are input to Interpolator Select 27 over the Cabling 28 and 29, respectively. It should be understood that only one mode of interpolation takes place for a given block of data from Tape 12 and hence only one of the Interpolators 22 or 23 is active at a given time. The interpolated data from Interpolator Select 27 are supplied to Servo Control Circuit 31 over Cabling 32. The actual drive motors can be analog servos or pulse motors and accordingly Servo Control Circuit 31 will contain digital to analog converters when analog servos are used or pulse shaping networks when pulse motors are utilized, in addition to any other control circuitry required. The details of the Servo Control Circuitry 31 will vary depending upon the nature of the drive motors but the details are within the purview of one skilled in the art. It should be understood that there will be one drive motor for each axis in the coordinate system so that a three axes machine tool system will utilize three servos while a two axis graphic plotting system will utilize two servos, etc.

A Driver Element 33 such as a machine tool cutter, graphic plotter pen or CRT deflection beam is caused to follow the desired path in accordance with the input data supplied from Tape 12 through Interpolators 22 and 23. The actual position of the Driven Element 33 can be detected by transducers of known type which can be associated with either the actual driven element or the lead screws which drive the element and these signals are then fed back to Servo Control 31 over the Feedback Line 34 and also to Interpolators 22 and 23 over Feedback Line 35, the actual position signals are also fed to Console 19 for display purposes as a convenience to the operator. Feedback signals for a CRT system can be provided by way of an optical system associated with the CRT system. A wide variety of feedback devices for machine tool, graphic plotters and CRT displays are available and, therefore, details are not required herein.

The various parameters injected into Preprocessor 16 from Tape 12 are shown in FIG. 2. Preprocessor 16 receives the parameter inputs and readies the data for injection into Linear Interpolator 22 and Circular Interpolator 23. The various parameters supplied to Preprocessor 16 are defined hereinabove in the Glossary of Terms. Preprocessor 16 combines the various parameters in mathematical fashion to define other parameters in accordance with the expressions shown in FIG. 2 and fully described hereinafter. Preprocessor 16 therefore is an arithmic unit in that it performs addition, subtraction, multiplication, division and takes square roots. Accordingly, Preprocessor 16 can be either a hardware or a software unit. For a software reduction to practice flow charts would be developed and a complete program listing written. For a hardware reduction to practice a block diagram would be developed and a set of assembly drawings made. In either event, because the arithmetic steps performed are simple addition, subtraction, multiplication, division and taking of square roots, numerous software and hardware logic embodiments are readily available in the art and accordingly additional details are not required herein. For example, the more sophisticated pocket calculators presently used by many engineers are capable of performing all these operations and thus the ROM logic circuitry used in such calculators can be used in Preprocessor 16.

The output parameters from Preprocessor 16 which serve as input parameters to Linear Interpolator 22, and Circular Interpolator 23 are also shown in FIG. 2. Preprocessor 16 has a series of Input Lines 36 through 45 each of which is utilized to input a particular parameter into the preprocessor. Each of the parameters available as an input to Preprocessor 16 is provided from the Tape Reader 11 and thus these data are stored on the Tape 12 in accordance with the desired path of the controlled element as defined by the expressions developed and explained hereinafter. Preprocessor 16 then processes the input signals and provides the linear interpolation parameters to Linear Interpolator 22 over Leads 46 through 52 and the circular interpolation parameters to the Circular Interpolator 23 over Input Leads 56 through 60. In addition to the parameters which are specific to either linear or circular interpolation Preprocessor 16 supplies three parameters over Leads 53 to 55 to an Intermediate Rate Processor 63 to provide some additional parameters which are specific to either linear or circular interpolation but which require additional inputs and thus cannot be processed in Preprocessor 16. Accordingly, Intermediate Rate Processor 63 receives an $f_o$ signal on Line 61 and a $\rho$ signal on Line 62. These two signals are received from the Control Console 19 and thus can be input by the N/C operator. The $f_o$ input is the feedrate override multiplier and thus is utilized to change the feed rate of the system. The $\rho$ input available on Line 62 is used when a rotating part is cut on a lathe. In graphic plotter N/C systems, CRT N/C systems and some machine tool systems the $\rho$ input is not used. It should be understood that for a particular segment of the total controlled element motion either linear or circular interpolation will be utilized. For this reason, for a given portion of the controlled element motion signals will be input to either Linear Interpolator 22 or Circular Interpolator 23, but not to both. The type of interpolation employed is determined by the input parameters to Preprocessor 16 and therefore the mode of interpolation is established by the data places on the storage Tape 12. Accordingly, the type of interpolation used is selected by the individual who is responsible for optimizing the functioning of the system.

The manner in which the data are processed for linear interpolation can be understood by making reference to FIG. 3. In FIG. 3 a straight line segment D is to be followed by the controlled element. The segment is positioned with respect to X and Y axes so that the start point of the segment is identified in absolute coordinates as $x_s\, y_s$ and the end point of the segment is defined in absolute coordinates as $x_f\, y_f$.

Before proceeding it should be understood that Segment D is a small fraction of the total trajectory path and is represented on Tape 12 as one data segment. Also, Segment D is a straight line but can be a portion of a curved line, this concept can be understood from FIG. 9. In FIG. 9 the curve from A to B can be closely approximated by sequentially driving the controlled element along the straight line segments 167 to 170, the inertia of the system helps smooth the curve so that any discontinuities are substantially smoothed. In such an operation the end point of one segment is coincident with the start point of the next segment; thus in FIG. 9 point C is the end point of Segment 167 and the start point of Segment 168. The inventive system employs the FIG. 9 concept in the linear interpolation mode and each of the Segments 167 to 170 would therefore be generated in accordance with the data processing technique described with respect to FIG. 3 and each of the Segments 167 to 170 would require one data block on Tape 12. As explained hereinafter because the end point $x_f\, y_f$ of Segment D in FIG. 3 is accurately obtained with the invention the overall path is also accurately traced.

From the geometry of FIG. 3 it is evident that:

$$D = \Delta x^2 + \Delta y^2 \tag{1}$$

It also is evident from FIG. 3 that the slope of Segment D is defined by the ratios:

$$Mx = \Delta x/D \text{ and } My = \Delta y/D \tag{2}$$

The Mx and My values are constant for any feedrate. Therefore feedrate changes can be introduced without disrupting the interpolating data. Feedrate can be introduced by computing the number of sample periods (T) for the line segment D:

$$t = 60D/f \quad N = t/T \tag{3}$$

or to the nearest integer $$N = \text{rounded } [60/T \cdot D/f] \tag{4}$$

The sample increment $\Delta D$ can now be written as:

$$\Delta D = D/N \tag{5}$$

Hence from FIG. 3 it can be seen that for the motion increment $\Delta D$ the interpolation formulae can be written as:

$$d_{i+1} = d_i + \Delta D \tag{6}$$

$$x_{i+1} = x_s \pm M x d_{i+1} \tag{7}$$

$$y_{i+1} = y_s \pm M y d_{i+1} \tag{8}$$

and the termination criteria is written as:

$$D - d_{i+1} \quad \epsilon \tag{9}$$

This approach minimizes intermediate computations and allows simple implementation of IPR/SFM (inches per revolution/surface feet/minute) control. Examination of equations 6, 7 and 8 shows that motion along Segment D is incrementally effected by progressively travelling along the Subsegments $\Delta D$. Typically in N/C systems each Subsegment $\Delta D$ travel would require both system updating and servo loop updating thereby consuming substantial real time capability of the system. The requirement is eliminated in the invention because the interpolation parameters are the same for each Subsegment $\Delta D$. Accordingly, system updating occurs only at the end of each Segment D when a change takes place in the interpolation parameters. Another advantage arises from the manner of selecting the length $\Delta D$ and number N of Subsegments because both of these parameters can readily be varied from segment to segment. However, because the length $\Delta D$ and number N are constrained for each segment the end point $x_f y_f$ for each segment is effectively forced so that the overall system accuracy is substantially increased.

The approach to linear interpolation described above permits the computation of an intermediate feedrate constant (FDK') such that:

$$FDK' = T/60 \cdot f \tag{10}$$

where $f$ is the feedrate in IPM. Therefore for feedrate override:

$$FDK = FDK' \cdot f_o \tag{11}$$

where $f_o$ is the feedrate override multiplier.

It is now possible to relate $\Delta D$ and FDK:

$$\Delta D = \frac{D}{N} = D\left[\left(\frac{T}{60}\right)\left(\frac{ff_o}{D}\right)\right] = FDK \tag{12}$$

The termination zone when using feedrate override can be written as:

$$\epsilon = 1.5\Delta D \tag{13}$$

For IPR/SFM feedrates, the distance from the turning axis to the tool center ($\rho$) affects the distance traversed in a sample interval ($\Delta D$) in accordance with the feedrate intermediate constant so that:

$$\Delta D = FDK(1/\rho) \tag{14}$$

Another significant advantage of the invention is now apparent because feedrate override can be applied without disturbing the interpolation equations. Thus, feedrate override can readily be applied without updating the system and without regard to the interpolation parameters. This advantage also inures to the benefit of the circular interpolation mode, as explained hereinafter.

The manner in which the data are processed when circular interpolation is employed can be understood by making reference to FIG. 4. FIG. 4 shows a vector $R_i$ having the end point located at $x_i y_i$ in an $xy$ coordinate system. The Figure also shows the $R_i$ vector being rotated either clockwise or counterclockwise through an angle $+\sigma_i$ or $-\sigma_i$ to the position at which the end point lies at the new coordinates $x_{i+1} y_{i+1}$. The start point of the radius $R_i$ lies at the 00 origin of the coordinate system. This origin varies in absolute coordinates for each data segment which defines an arc and is determined as shown by Adder 126 in FIG. 6. The length of the radius also varies for each arc defining data segment.

From FIG. 4

$$R_i^2 = x_i^2 + y_i^2 \text{ and } \tan \sigma_i = \delta_i/R_i \tag{15}$$

Setting the angle $\sigma_i$ through which $R_i$ is rotated clockwise or counterclockwise to:

$$\sigma_i = \tan^{-1} 2^{-i} \text{ THEN } \delta_i/R_i = 2^{-i} \tag{16}$$

For $-\sigma_i$ BY SIMILAR TRIANGLES:

$$\cos\alpha = \frac{y_i}{R_i} = \frac{x_{i+1} - x_i}{\delta_i} \tag{17}$$

$$\frac{x_{i+1} - x_i}{\delta_i} = \frac{y_i}{R_i} \text{ OR } x_{i+1} = x_i + \frac{\delta_i}{R_i} y_i \tag{18}$$

and by substitution:

$$x_{i+1} = x_i + 2^{-i} y_i \tag{19}$$

AND $$\frac{y_i - y_{i+1}}{\delta_i} = \frac{x_i}{R_i} \text{ OR } y_{i+1} = y_i - \frac{\delta_i}{R_i} x \tag{29}$$

$$y_{i+1} = y_i - 2^{-i} x_i \tag{21}$$

$$y_{i+1} = y_i - 2^{-i} x_i \tag{21}$$

SIMILARLY FOR $+\sigma_i$ $$x_{i+1} = x_i - y_i 2^{-i} \quad y_{i+1} = y_i + x_i 2^{-i} \tag{22}$$

Vector $R_i$ can be rotated through any arbitrary angle $\theta_i$ where:

$$\theta = \Sigma \sigma_i \quad 0\text{deg} < \theta < 90° \tag{23}$$

It is now apparent that the end point of radius $R_i$ can be changed within the coordinate system by sequentially rotating the vector through the angle $\sigma$. The number of rotations, that is iterations, and the angle $\sigma$ are determined by the total angle of rotation $\theta$ to be taken within a data segment. Thus, the circular interpolation technique is also advantageous because the final point can be forced and because feedrate override can be employed without disturbing the interpolation process in much the same manner as the linear interpolation scheme.

For each rotation through an angle $\sigma_i$, $R_i$ is increased in length by the factor $(1+2^{-2i})^{1/2}$ $$R_{i+1} = (R_i^2 + \delta_i^2)^{1/2} \text{ WHERE } \delta_i = R_i 2^{-i} \tag{24}$$

THUS $$R_{i+1} = (R_i^2 + R_i^2 \, 2^{-2i})^{1/2} = R_i(1+2^{-2i})^{1/2} \tag{25}$$

AND FOR N ITERATIONS $$R_N = R_0 (1+2^{-0})(1+2^{-2})(1+2^{-4})\ldots(1+2^{-2N}) \tag{26}$$

OR $$R_N = R_0 \prod_{i=0}^{N} (1+2^{-2i})^{1/2} \tag{27}$$

Additional details of this circular interpolation technique can be found in an article entitled "Cordic Technique Reduces Trigonometric Function Look-Up" by M. D. Perle Published June 1971 in Computer Design at pages 72 to 78.

FIG. 5 is a preferred embodiment of logic utilized in Input Logic 15 (FIG. 1) when the invention is reduced to practice utilizing an erasable memory digital computer. Such a system commonly would be referred to as a software system. It should be understood that Input Logic 15 can be reduced to practice using either discreet circuits or ROM while retaining the order of logic functions illustrated in FIG. 5. If a hardware reduction to practice is chosen, FIG. 5 would serve as a block diagram and the operational capabilities of the system would remain unchanged. Because of the equivalence of hardware and software, throughout this application the various operational steps will interchangeably be referred to as "logic circuits," "logic operations" and "functional steps" and when one of these terms is used the others can be used with equal validity.

As is typical with numerical control systems a Clock Input 68 is provided to the control logic. The first logic operational is Disable Interrupts 69 which immunizes the system from communications until the preprocessing logic has completely performed all required functions. After the interrupts are disabled, logic operation Save Registers 71 is utilized to prevent loss of in process information in the event that the interrupt appeared before previously required data processing is completed. Set Counter Logic Circuit 72 then sets the system counters to zero and the system is then ready to receive data from Preprocessor 16. Carry Bit Logic 73 then provides a carry bit which signifies to enable Tape Reader Circuit 74 that the system is now ready to receive data.

The actual positions of the controlled element with respect to all axes of the system are input to the system through Input Axes Positions Logic 75. As shown in FIG. 1 the actual axes positions are received from the feedback transducer associated with the Machine Tool 33 over Feedback Lines 34 and 35. The commanded final axes positions of the controlled element (the $x_fy_f$ positions) are input from the Preprocessor 16 as indicated by Logic Function 80. As shown in FIG. 2 the parameters $x_s, y_s, \Delta x$ and $\Delta y$ are provided from Tape 12 and utilized in Preprocessor 16 to calculate the commanded $x_x, y_f$ positions. Calculate Axes Velocities Logic operation 76 then calculates the velocities at which the controlled element will travel along the several driven axes. This is done by subtracting the absolute actual axes positions received from the feedback transducers from the absolute commanded axes received from Preprocessor 16. The axes velocities are determined by this simple subtraction. However, override can be provided at Intermediate Rate Processor 63. When linear interpolation is used the velocities along the individual axes will be in the same ratio as the distances $\Delta x$ and $\Delta y$ along the axes, this is explained hereinabove with respect to FIG. 3.

After the axes velocities are calculated at Logic Step 76, Transfer Logic 77 is entered into, this step is used to determine whether or not a transfer to a subsequent block of data should take place. The decision as to whether or not a data transfer should take place is dependent upon whether or not any data are available for interpolation. Thus, when the last iteration of an interpolation sequence is complete a transfer to the subsequent block of data is effected. When a data transfer is not indicated Transfer Circuit 77 communicates with Feedrate Override 78 for a determination of whether or not a feedrate change must be made. When a change of feedrate is indicated Multiplier Logic 79 makes the feedrate change in accordance with the expression $\Delta D = FDK \cdot f_o$. The $\Delta D$ and $FDK$ terms are available from Preprocessor 16 while $f_o$ can be either manually input or automatically available from Intermediate Rate Processor 63. Multiplier Logic 79 also calculates the range of motion termination zone $\epsilon$ in accordance with $\epsilon = 1.5\Delta D$ when a rotating workpiece is being worked on, such as when a lathe is used. As explained hereinabove with respect to equations (11) and (12) and FIG. 3, the feedrate override multiplier $f_o$ determines the distance traveled ($\Delta D$) in one sample interval. The distance traveled $\Delta D$ for each sample interval from $d_i$ to $d_{i+1}$ is calculated only once for each travel Segment D (FIG. 3) from start point $x_s, y_s$ to end point $x_fy_f$. Thus the feedrate override multiplier $f_o$ need be changed only for each travel Segment D rather than for each Subsegment $\Delta D$. This is a marked saving in real time computation of the system because typically In N/C systems the feedrate override multiplier must be applied for every set of data within a data segment. However, feedrate override can be applied manually during any data block if desired. It should be noted that feedrate override is applied before the interpolation mode is selected. Accordingly, the circular interpolation override calculations shown in Intermediate Rate Processor 63 of FIG. 2 will be made when circular interpolation is used.

When feedrate override is not required Multiplier 78 is bypassed. Accordingly, the next operation after the feedrate override determination is the addition which ultimately indicates when the entire segment D (FIG. 3) is traveled. This can be best understood from FIGS. 3 and 5. Adder Logic 81 functions in accordance with the equation $d_{i+1} = d_i + \Delta D$. This operation is continuous until data sufficient to cause the controlled element to traverse the entire segment D are input to the system. The sufficiency of data for traversal of the entire segment D is determined by Logic Circuit 82. The addition $d_{i+1} = d_i + \Delta D$ and $d_{i+2} = d_{i+1} + \Delta D$ etc. continues until $\Sigma \Delta D = D$. The determination of this condition is made in Logic 82 in accordance with the expression $D - d - \epsilon$ 0. Thus, each addition made by Adder 81 is checked to verify that the difference between the sum output of Adder 81 and the value $\epsilon$ is less than zero. When a negative value is indicated the last pass has not been reached and data are available to the Interpolation Select Logic 84. When the difference is zero the last pass is indicated and Set For Transfer 83 is set. It should be understood that the summation which takes place in Adder 81 adds the number of iterations for each data block. Thus, when circular interpolation is used the summation is the total of the $\sigma$ iterations which are explained with respect to FIG. 4. Therefore for circular interpolation the $\sigma$ parameter replaces the $d$ parameter used for linear interpolation.

Figure 6:
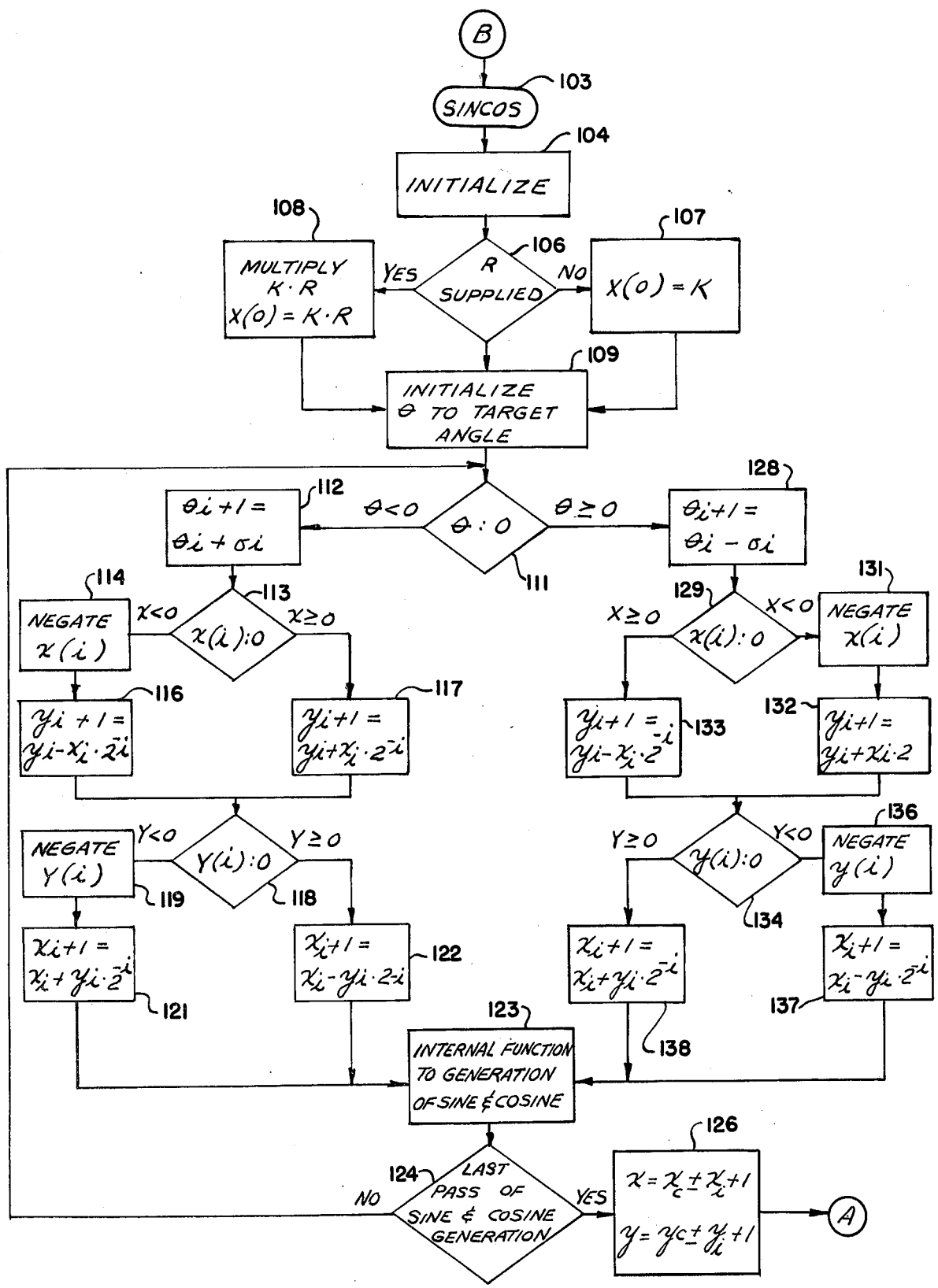
FIG. 6 is a preferred embodiment of a circular interpolator for the system.
Figure 10:
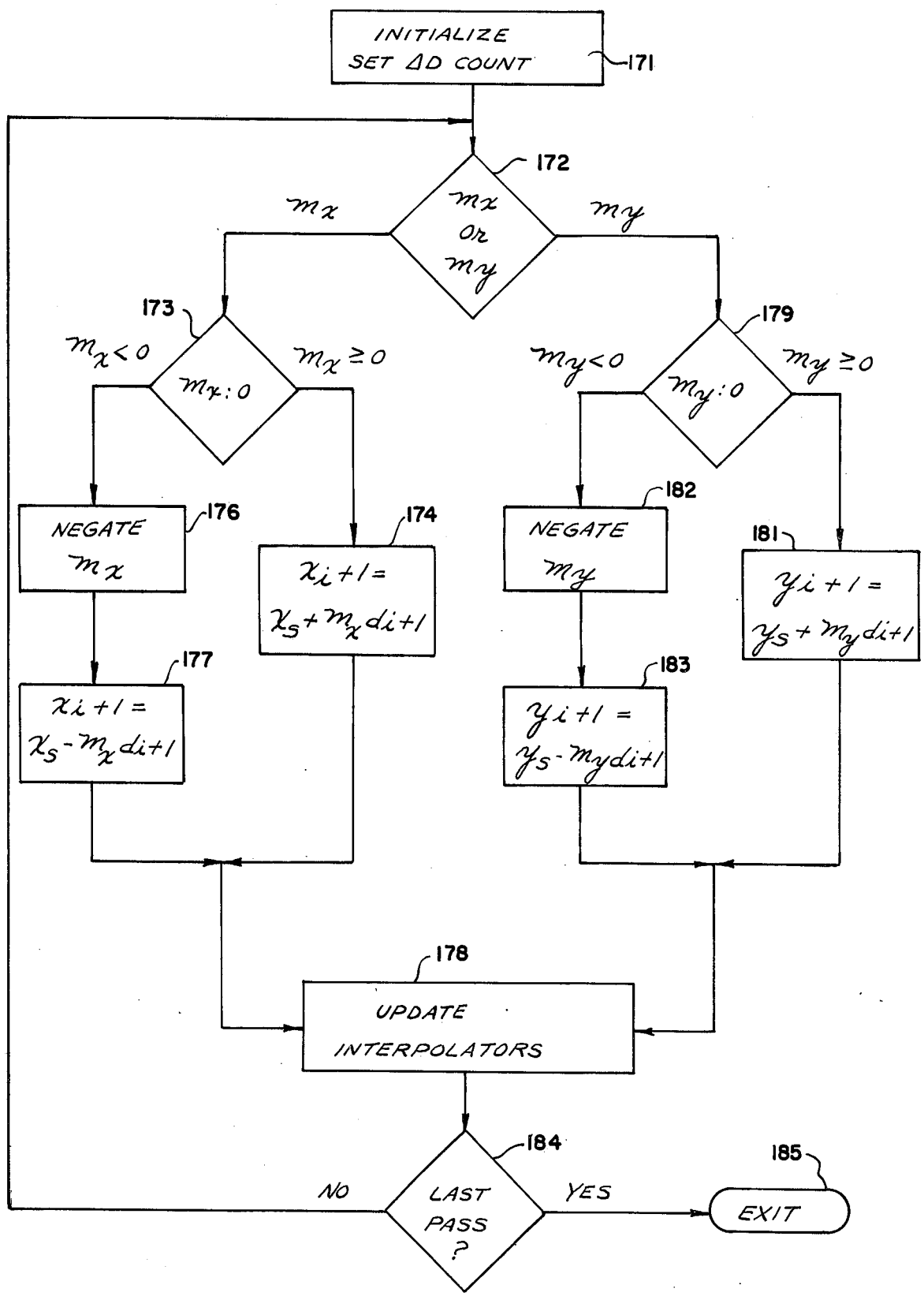
FIG. 10 is a preferred embodiment of a software style linear interpolator.

When the last pass has not been indicated and Interpolation Select Circuitry 84 becomes effective, the data are processed in accordance with circular interpolation as described with respect to FIG. 6, or linear interpolation broadly indicated by Circuit 86 and more fully described with respect to FIG. 10.

Reference to equations 3, 4, and 5 shows the value of $\Delta D$ is a function of the total segment traversal D and the number N of sample intervals per motion segment traversal. Accordingly, the end point of the segment traveled is forced by the $\Delta D$ determination resulting in a distinct advantage over prior art systems. In a similar manner, equations 15 to 22 show that the total rotation angle $\theta$ through which the vector R is rotated is determined by the selection of iteration angle $\sigma$ and the number of iterations. The final position of the radius R end point therefore is also forced. Additionally, because of the independence of $\Delta D$ and $\sigma$ upon other parameters feedrate override can be applied without requiring recalculation of other parameters and the feedrate override calculation need be made only once for each total motion excursion D, or each total angle excursion $\theta$.

Referring again to Transfer Logic 77, when data transfer is to occur, a test routine is entered into to verify that the equipment is ready to receive the data so that no damage to the equipment or system is caused by the transfer. Accordingly, Logic Circuit 87 verifies that the servos which drive the controlled element are within their proper ranges. This verification is needed only when a positioning operation as opposed to a contouring operation is used. In positioning, such as placing dots with a graphic system or drilling holes with a machine tool system, it is necessary to stop the driven element at the commanded position and therefore the range verification is required. However, when contouring it is undesirable to stop because dwell marks, or ink blotches, will be formed and therefore range verification will not be made in this mode. Upon an affirmative servo range verification Logic Circuit 88 is utilized to verify that data are available for transfer to the system. An affirmative verification of data availability is followed by Transfer Enable Circuit 89 verifying that a transfer enable signal is available in the system. The test routine then proceeds to Hold Condition Circuit 91 where the presence or absence of a hold condition is checked. The absence of a hold condition indicates that the system is in a ready condition and Logic Circuit 92 issues a Transfer Preprocessed Data order to Last Pass Adder 82 and Set For Transfer Circuit 83 sets the system for transfer when the last pass is indicated by Adder 82.

Figure 7:
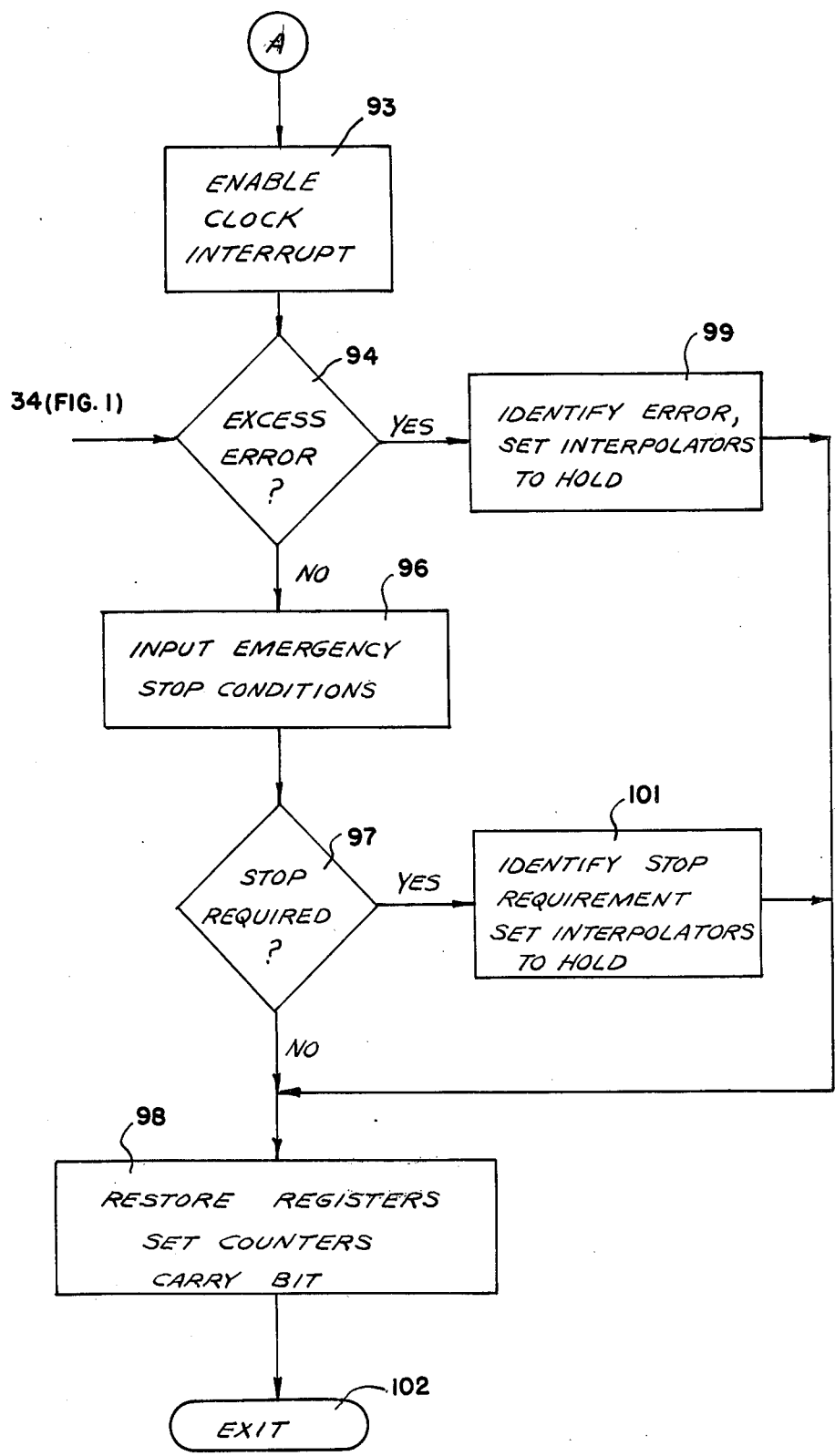
FIG. 7 shows the logic for verifying the readiness of the numerical control system for operation.

It should be noted that if a NO is indicated by any of the Servo Within Range 87 verification, the Transfer 88 verification, or the Transfer Enable 89 verification, or if a HOLD condition is indicated by Hold Condition 91, data transfer is not effected and the test routine illustrated in FIG. 7 is entered into so that the exact nature of the difficulty is identified. The indication of any of the NO conditions or a HOLD condition can simply mean a transfer is not yet justified. The test routine of FIG. 7 nevertheless is entered.

FIG. 7 is a flow chart of the test routine which is carried out when one of the tests for transferring data to the interpolators has indicated that the transfer should not take place. The first step in the test routine is the enablement of the clock interrupts as indicated by Logic 93. After the enablement of the clock interrupts Servo Excess Error Circuit 94 determines whether or not the servos are capable of performing as commanded. This is determined by comparing the actual axes positions, input on Line 34, with the commanded axes positions of the controlled element with respect to all axes along which the element is to be driven. As an example, an excess error will exist if the difference between the actual and commanded positions results in an axis velocity requirement in excess of the capability of the drive motor. When an excess error does exist Logic 99 is utilized to identify the error and set all interpolators to a hold condition. After the interpolators are set to hold Logic Circuit 98 is utilized to restore the registers, set the counters, and establish the carry bit in accordance with the initial steps of logic diagram in FIG. 5.

When Excess Error Logic 94 indicates that there is no excess error, testing proceeds to Logic 96 where any condition which would demand the issuance of an emergency top signal are provided to the system. Comparison Logic 97 is utilized to compare the actual systems conditions to the input emergency stop conditions and if a comparison is found, a YES condition exists and a stop signal issued. Upon the issuance of the Stop Signal, Logic 101 is used to identify the stop requirement and to set all interpolators to Hold condition. Again, after the interpolators are set to hold, Logic 98 is used to restore the registers and set the counters, etc. When Comparison Logic 97 indicates that an emergency stop condition does not exist, data processing proceeds to Logic 98 and the data processing described with respect to FIG. 5 is again carried out.

When circular interpolation is to be used, the logic diagram described with respect to FIG. 6 is followed. The Logic shown in FIG. 6 generates the sine and cosine values of the angle $\theta$ illustrated in FIG. 4. The sine and cosine for angle $\theta$ are required because rotation of vector $R_i$ through the angle $\theta$ defines the resulting $x$ and $y$ components respectively as the sine and cosine of $\theta$. This is shown by equations 18 and 20 where the $Y_i/R$ and $X_i/R$ respectively are the sine $\theta$ and the cosine $\theta$. The values of $\theta$ are initialized by Logic 104. Logic 106 then makes a determination whether or not the radius R has been input to the system. When a radius R value is not supplied, processing proceeds to Multiplier Logic Circuit 107 where a value for the radius is supplied in accordance with the equation $x(0)=K$. The resulting K value which is the elongation factor for R as it is rotated, as shown in equation 27 as $R_n$, is then supplied to Logic 109 where the angle $\theta$ is initialized to the target angle. When an R value has been supplied at Logic Circuit 106, Logic Circuit 108 is used to set $x(0)=K \cdot R$ after which initialization Circuit 109 again initializes $\theta$ to the target angle. Accordingly, for each angle $\sigma$ iteration data processing proceeds in the manner shown in FIG. 6. If $\sigma$ is positive processing proceeds through Logic Function 128 and if $\sigma$ is negative processing proceeds through Logic Function 112.

After initialization of $\theta$ to the target angle, Logic 111 is utilized to determine whether the rotation angle $\theta$ is counterclockwise; that is negative, or clockwise; that is positive. When $\theta$ is negative, Adder Logic 112 is utilized to establish the value $\theta_{i+1} = \theta_i + \sigma_i$. Comparison Logic 113 compares the $x(i)$ with zero to determine whether the value of $x(i)$ is positive or negative. When a negative is indicated, Circuit 114 takes the compliment because a negative number can not be shifted with ditigal logic. After Logic 114 renders $x(i)$ positive, Adder Logic Circuit 116 is used to establish the value $y_i^+_1 = y_i - x_i \cdot 2^{-i}$. When the comparison at Step 113 is positive, Adder Logic 117 calculates the $y_i^-_1$ parameter. In both Adder Logic 116 and 117 the $2^{-i}$ multiple is effected by shifting the data in the register one bit to the right. Accordingly, the $2^{-i}$ parameter need not be input from Preprocessor 16.

Essentially, the same processing for the y parameter is effected starting with Logic 118 which compares $y(i)$ with zero to determine whether $y$ is positive or negative. When $y$ is negative Logic 119 and 121 are used to establish the value $x_{i+1} = x_i + y_i \cdot 2^{-i}$. Alternatively, when $y$ is positive, Logic 122 is used to establish the value $x_{i+1} = x_i - y_i \cdot 2^{-i}$. Logic 123 is then used to update the pointers to show which iteration has been effected. Processing then proceeds to Last Pass Logic 124 where data routing occurs depending upon whether or not the entire angle $\theta$ has been effected. The Last Pass is determined by comparing the total number of passes, irrespective of whether they are input from Circuit 121, 122, 137, or 138 and comparing with the set value of $i$, when the counted passes equals or exceeds the set value $i$ a Last Pass output is given. If data for the entire angle excursion has been inut as indicated by an affirmative last pass indication, Adder Logic 126 calculates the location of the center of the circular excursion in absolute coordinates with respect to the 0.0 intersection of the coordinate axes system. The system then returns to A as shown in FIG. 7. When the last pass is not indicated by Last Pass Logic 124, the data processing is referred back to Comparison Logic 111 to repeat the data processing procedure for the next iteration of the angle $\sigma$.

Referring back to Logic 111 when the angle $\theta$ is greater than zero data processing proceeds to Addition Logic 128 where the operation $\theta_{i+1} = \theta_i - \sigma_i$ is effected. Thus, positive excursions of $\sigma$ are effected through the logic branching from Logic Circuit 112 and negative excursions through the logic branching from Logic Circuit 128. After the $\theta_{i+1}$ value is determined, Comparison Logic 129 compares $x(i)$ with zero to determine whether $x$ is greater or less than zero. When $x$ is less than zero, the negative Logic 131 and Adder Logic 132 establish the value $y_{i+1} = y_i + x_i \cdot 2^{-i}$. Alternatively, when Comparison Logic 129 indicates that $x$ is greater than zero, Adder Logic 133 establishes the value $y_{i+1} = y_i - x_i \cdot 2^{-i}$.

Irrespective of the polarity of $x$, Comparison Logic 134 compares the $y(i)$ parameter with zero to determine the positive or negative polarity of $y$. When $y$ is positive Adder Logic 138 establishes the value $x_{i+1} = x_i + y_i \cdot 2^{-i}$. Alternatively, when $y$ is negative, Logic 136 and Adder 137 establish the value $x_i = x_i - y_i \cdot 2^{-i}$. Data processing continues from both Adders 137 and 138 to Update Interpolators Logic 123 after which the Last Pass Comparison is made in the same manner as described for the Logic 121 and 122.

Figure 8:
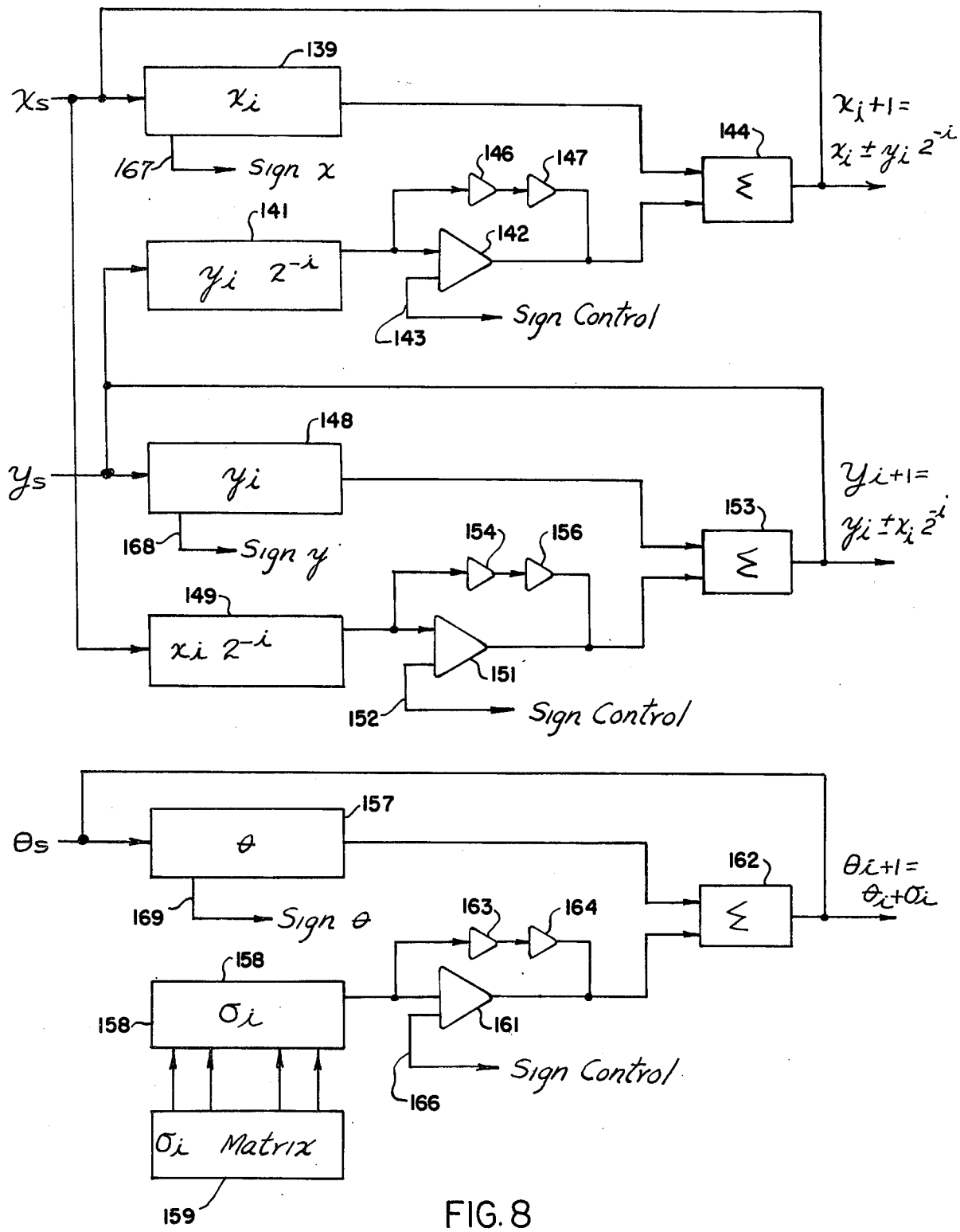
FIG. 8 is a preferred embodiment of a hardwired circular interpolator.

The preferred embodiment shown in FIG. 6 is utilized when the circular interpolation function is carried out utilizing an erasable memory computer, that is a software system. A preferred embodiment which can be utilized to carry out the circular interpolation calculations utilizing a hardware system is illustrated in FIG. 8. The hardware circular interpolator includes a series of Shift Registers 139, 141, 148, 149, 157 and 158. Shift Registers 139, 148, and 157 are respectively utilized to store the $x_i$ and $y_i$ and $\theta$ values. Shift Registers 141 and 149 are used to effect the $y2^{-i}$ and $x2^{-i}$ values while Register 158 is utilized to store the values. Also a register 159 stores the interation angle $_i$ matrix to establish the number of iterations in accordance with the desired accuracy of the sine and cosine generation and enters them into the Register 158.

Each of the registers 139, 148 and 157 has a sign control 167, 168, and 169 respectively. The logic status of the sign control determines whether the + or − value of the respective stored parameter will be sent to the respective adder 144, 153, or 162.

The output of $x_i$ Register 139 is coupled to Adder Circuit 144. Also the output of $y_i$ Register 141 is coupled to Adder 144 through sign control logic composed of Gates 142, 146 and 147. Logic Gates 142, 146 and 147 are used to take the two's compliment when the $y_i 2^{-i}$ value is negative because a negative cannot be shifted. Adder 144 adds the $x_i$ and $y_i 2^{-i}$ values received from Registers 139 and 141 so that the sum required by equations 19 or 21 are output by the Adder 144.

Registers 148 and 149 cooperate with Adder 153 to provide the $y_i \pm x_i 2^{-i}$ values in the same manner that Registers 139, 141 cooperate with Adder 144. Also Registers 157 and 158 cooperate with Adder 162 to provide the required $\theta$ values. However, the $\sigma_i$ Matrix Register 159 enters one of the fixed $\sigma$ angles into the $\sigma$ Register 158 at the beginning of each iteration. Accordingly, the circular interpolation equations 19, 21 and 22 are implemented with the hardwired system illustrated in FIG. 8.

FIG. 10 is a preferred embodiment of a software system which can be used to carry out the linear interpolation of the inventive system. The preferred embodiment of FIG. 10 is a more detailed showing of the linear interpolation Block 86 shown in FIG. 5. At the beginning of the linear interpolation, the system is initialized and the number of $\Delta D$ iterations is set as indicated at Functional Block 171. The Decision Circuit 172 then makes a decision whether the incoming data is to be processed for the $mx$ or $my$ parameters. When the $mx$ parameter is incoming Comparison Circuit 173 compares $mx$ with 0 to determine whether a negative or positive number is to be processed. When the slope $mx$ is positive, Adder Logic 174 processes the data to arrive at the $x_{i+1} = x_s + m_x \cdot d_{i+1}$. When Comparison Logic 173 shows that the $mx$ value is negative, Negate Logic 176 renders the mx value positive by taking the twos compliment so that shifting can occur in the Adder Logic 177. Adder Logic 177 then calculates the value $x_{i+1} = x_s - m_x \, d_{i+1}$. The added value from either adder 174, 177, then goes to Update Interpolators 178.

Referring back to comparison Logic 172 when the incoming data is to be processed according to the slope $m_y$, Comparison Logic 179 compares the $m_y$ value to determine whether it is positive or negative. When a positive slope is indicated, Adder Logic 181 processes the data for the next $y$ value and when the slope $m_y$ is negative, Logic 182 and 183 processes the data for the next $y$ value. In the same manner that the slope $m_x$ is processed, the updated $y$ and $x$ values are both fed to Update Interpolators 178 and Comparison Logic 184 determines whether the Last Pass has been executed. The execution of the last pass is determined by whether or not the number of iterations is less than the set count. Hence, as long as the compared value is negative the last pass has not been indicated and the NO decision is directed to Comparison Circuit 172 to repeat of the process. As soon as the last pass comparison results in a zero or positive value, the last pass has been indicated and the routine exits as indicated at 185.

We claim:

1. A numerical control system for controllably moving an element along a motion path of arbitrary configuration; said system including means for receiving data numerically defining said motion path from a storage medium, system logic for preprocessing and interpolating said data, and means for receiving said data from said system logic and moving said element along said path, said system logic including:

preprocessor means for receiving said data and providing linear interpolating data and circular interpolating data;

said linear interpolating data defining the movement of said element as a straight line segment lying between a start point and an end point at an arbitrary angle with respect to at least two mutually perpendicular axes;

said preprocessor means including means for generating a plurality of sample intervals for each of said segments, the number and length of said sample intervals varying for different segments so that each segment includes an integral number of said sample intervals and said end point for each segment is accurately forced;

said circular interpolating data defining the movement of said element as the rotation of the end of a radius through a total angular excursion from a first position to a final position;

said preprocessor means including means for generating a plurality of subangular excursions for each of said angular excursions, the number and extent of said subangular excursions varying for different angular excursions so that each angular excursion includes an integral number of said subangular excursions and said final position for each angular excursion is accurately forced;

linear interpolating means receiving said linear interpolating data for generating linear interpolated data indicative of the end points for each liner sample interval and apply said linear interpolated data to said means for receiving and moving;

circular interpolting means receiving said circular interpolating data for generating circular interpolated data indicative of the end points for each subangular excursion and applying said circular interpolated data to said means for receiving and moving.

2. The system of claim 1 further including means for applying feedrate override to said linear interpolating means and said circular interpolating means to change the velocity of motion of said element independently of said linear interpolated data and said circular interpolated data.

3. The system of claim 2 wherein said linear interpolating means includes multiplier means and addition means.

4. The system of claim 2 wherein said circular interpolating means includes multiplier means and addition means.

5. The system of claim 3 wherein said circular interpolating means includes multiplier means and addition means.

6. A method of controlling the path of an element in a numerical control system including the steps of:
providing input data in accordance with the desired path of said element;
selectively preprocessing said input data into linear interpolating data and circular interpolating data, said preprocessing including the step of:
preprocessing said input data for linear interpolating by fragmenting said path into a series of straight line segments lying between start points and end points, generating a plurality of sample intervals for each of said segments, varying the number and length of said sample intervals so that an integral number of said sample intervals is generated for each segment and said end point is accurately forced; and
preprocessing said input data for circular interpolating by defining said path as the end point of a radius rotated through an angular excursion between a start point and an end point, generating a plurality of sample excursions for each angular excursion, varying the number and extent of said sample excursions so that an integral number of said sample excursions is generated for each of said angular excursions and said end point is accurately forced;
updating said system at the end of each segment when linear interpolating is used and at the end of each angular excursion where circular interpolation is used;
linear interpolating said linear interpolating data to generate linear interpolated data indicative of the end points for each sample interval; and
circular interpolating said circular interpolating data to generate circular interpolated data indicative of the end points for each sample excursion.

7. The method of claim 6 wherein said linear interpolating step includes the steps of digital addition and digital multiplication and said circular interpolating step includes the step of digital addition and digital multiplication.

* * * * *

UNITED STATES PATENT AND TRADEMARK OFFICE
CERTIFICATE OF CORRECTION

PATENT NO. : 4,031,369
DATED : June 21, 1977
INVENTOR(S) : James Patrick Heaman and James Anthony Michaud It is certified that error appears in the above-identified patent and that said Letters Patent are hereby corrected as shown below:

Col. 2, line 17, delete "process" insert --- proceed
Col. 4, line 30, delete "feed/minute" insert --- feet/minute
Col. 5, line 51, insert "interpolator" between "Linear" and "22"
Col. 8, line 27, after "di+1" insert -- $\leq$ - -.
Col. 9, line 38, delete "(16)" at end of equation and place at right edge of column
Col. 9, line 53, add subscript "i" to x - last occurrence Col. 10, line 52, delete "operational" insert --- operation
Col. 11, line 52, delete "In" insert --- in
Col. 13, line 40, delete "top" insert --- stop
Col. 14, line 45, delete "inut" insert --- input
Col. 15, line 22, insert "$\theta$" between "the" and "values"
Col. 15, line 23, delete "interation" insert --- iteration
Col. 15, line 23, insert "$\theta$" between "angle" and "i"
Col. 15, line 26, insert "$\theta$" between "the" and "register"

*Signed and Sealed this*

*Sixth* Day *of December 1977*

[SEAL]

Attest:

RUTH C. MASON
*Attesting Officer*

LUTRELLE F. PARKER
*Acting Commissioner of Patents and Trademarks*